United States Patent
Van Hoesel et al.

(10) Patent No.: US 9,396,717 B2
(45) Date of Patent: Jul. 19, 2016

(54) SYSTEMS AND METHODS FOR REDUCING UNWANTED SOUNDS IN SIGNALS RECEIVED FROM AN ARRANGEMENT OF MICROPHONES

(75) Inventors: Richard Van Hoesel, Chatswood (AU); Jorge Mejia, Chatswood (AU)

(73) Assignee: HEAR IP Pty Ltd., Victoria (AU)

( * ) Notice: Subject to any disclaimer, the term of this patent is extended or adjusted under 35 U.S.C. 154(b) by 627 days.

(21) Appl. No.: 13/823,639

(22) PCT Filed: Nov. 17, 2011

(86) PCT No.: PCT/AU2011/001476
§ 371 (c)(1),
(2), (4) Date: May 1, 2013

(87) PCT Pub. No.: WO2012/065217
PCT Pub. Date: May 24, 2012

(65) Prior Publication Data
US 2013/0223644 A1    Aug. 29, 2013

(30) Foreign Application Priority Data

Nov. 18, 2010  (AU) ................................ 2010905118

(51) Int. Cl.
| | |
|---|---|
| H04R 3/00 | (2006.01) |
| H04R 5/00 | (2006.01) |
| H04R 25/00 | (2006.01) |
| G10K 11/00 | (2006.01) |
| H04B 15/02 | (2006.01) |

(52) U.S. Cl.
CPC .............. *G10K 11/002* (2013.01); *H04B 15/02* (2013.01); *H04R 25/407* (2013.01); *H04R 25/552* (2013.01)

(58) Field of Classification Search
CPC .... G10K 11/002; H04B 15/02; H04R 25/407; H04R 25/552
USPC ............................................ 381/92, 23.1, 122
See application file for complete search history.

(56) References Cited

U.S. PATENT DOCUMENTS

| | | | |
|---|---|---|---|
| 6,002,776 A | 12/1999 | Bhadkamkar et al. | |
| 7,035,796 B1 | 4/2006 | Zhang et al. | |
| 2007/0021958 A1* | 1/2007 | Visser ................. | G10L 21/0272 704/226 |
| 2009/0116661 A1 | 5/2009 | Hetherington | |
| 2009/0190769 A1* | 7/2009 | Wang ....................... | H03G 3/32 361/66 |

FOREIGN PATENT DOCUMENTS

GB        2451118        4/2009

OTHER PUBLICATIONS

Extended European Search Report, Appln. No. 11841933.2, European Patent Office, Sep. 28, 2015.
Thomas Wittkop, Voker Hohmann, Strategy-selective noise reduction for binaural digital hearing aids, Elsevier, Speech Communication 39 (2009) pp. 111-138, Germany.
PCT/AU2011/001476, International Search Report, issued Mar. 8, 2012, ISA/AU.

* cited by examiner

*Primary Examiner* — Vivian Chin
*Assistant Examiner* — Douglas Suthers
(74) *Attorney, Agent, or Firm* — Procopio Cory Hargreaves and Savitch LLP

(57) ABSTRACT

A system and method for reducing unwanted sounds in signals received from an arrangement of microphones including: sensing sound sources distributed around a specified target direction by way of an arrangement of microphones to produce left and right microphone output signals; determining the power of the left and right microphone signals; determining the minimum of the two microphone power measures; and, attenuating the signals based on a comparison of the left and right microphone power measures with the minimum power measure.

22 Claims, 2 Drawing Sheets

SYSTEMS AND METHODS FOR REDUCING UNWANTED SOUNDS IN SIGNALS RECEIVED FROM AN ARRANGEMENT OF MICROPHONES

TECHNICAL FIELD

The present invention relates to systems and methods for reducing unwanted sounds in signals received from an arrangement of microphones.

BACKGROUND TO THE INVENTION

In hearing devices, such as hearing aids, background noise is detrimental to the intelligibility of speech sounds. Most modern hearing devices address this issue by introducing noise reduction processing technology into the microphone output signal paths. The aim is to increase the Signal-to-Noise (SNR) ratio available to listeners, hence improve clarity and ease of listening to the hearing device wearer.

The success of noise reduction processing often depends greatly on the formation of appropriate reference signals to estimate the noise, the reason being that the reference signal is used to optimize an adaptive filter that aims to eliminate the noise, ideally leaving only the target signal. However, such reference estimates are often inaccurate because most known techniques, such as Voice Activity Detection, are susceptible to errors. In turn, such inaccuracies lead to inappropriate filtering and degradation in the output quality of processed sound (target distortion), particularly at low SNR where noise reduction functions are most needed.

SUMMARY OF THE INVENTION

In a first aspect the present invention provides a method of reducing unwanted sounds in signals received from an arrangement of microphones including the steps of: sensing sound sources distributed around a specified target direction by way of an arrangement of microphones to produce left and right microphone output signals; determining the power of the left and right microphone signals; determining the minimum of the two microphone power measures; and, attenuating the signals based on a comparison of the left and right microphone power measures with the minimum power measure.

The comparison of the left and right microphone power measures may be based on the ratio of the microphone power and the minimum power.

The microphone output power and minimum power may be time-averaged.

The step of determining the power may be frequency specific.

The ratio between powers may be scaled by a function.
The scaling function may comprise compressor-expander.
The scaling function may be frequency dependent.
The method may further include the step of defining the target direction.

The target direction may be used to filter the left and right microphone output signals.

The step of filtering the microphone output signals may involve equalising the left and right signals relative to the target direction.

The scaling function may be controlled by the user.
The scaling function may be controlled by an automated process.

The target direction may be controlled by the user.
The target direction may be controlled by an automated process.

In a second aspect the present invention provides a system for reducing unwanted sounds in signals received from an arrangement of microphones including: sensing means for sound sources distributed around a specified target direction by way of an arrangement of microphones to produce left and right microphone output signals; determination means for determining the power of the left and right microphone signals; determination means for determining the minimum power of the microphone signals, attenuation means for attenuating the signals based on a comparison of the power and the minimum power.

The attenuation means may be arranged to attenuate each signal based on the ratio of the power of each signal and the minimum power.

The means of determining the power may include time averaging.

The ratio between powers may be scaled by a function.
The scaling function may comprise compressor-expander.
The scaling function may be controlled by the user or an automated process.

The target direction may be used to filter left and right microphone signals.

The target direction may be controlled by the user or an automated process.

In some embodiments, this signal processing technique reduces interference levels in spatially distributed sensor arrays, such as the microphone outputs available in bilateral hearing aids, when the desired target signal arrives from a different direction to those of interfering noise sources. The algorithm operates by determining for each frequency band the minimum of the monaural powers contained in the left and right microphone signals, and adjusting left and right signals by amounts determined by the ratios of time averaged monaural and minimum power levels. In the field of hearing, this technique can be applied to reduce the effect of noise in devices such as hearing aids, hearing protectors and cochlear implants.

Embodiments of the invention provide an improved and efficient scheme for the removal of noise present in microphone output signals without the need for complex and error-prone estimates of reference signals. In some embodiments, a signal processing algorithm preferably performs multi-channel analysis on at least one microphone output signal on each side of the head of a listener. Each frequency channel is analysed to estimate the power in the signal at each ear. In a subsequent step, the power estimates from the left and right ear in each channel are compared and the minimum power is selected. In a subsequent step, all three measures: left-ear power, right-ear power, and minimum power, are averaged over a short time for each channel. In a first stage, time-averaged left-ear and minimum power values are used to determine left-ear weights. Similarly, time-averaged right-ear and minimum power values are used to determine right-ear weights. The extent to which weights are adjusted (and therefore noise is reduced) is controlled with a scaled factor that is selected to simultaneously minimize audible distortions in the output signals. In a final adjustment, weights for both ears are scaled by a (scalable) factor derived from the smaller of the left and right ear weights. Accordingly, even when one ear consistently receives less power than the other, the signal level is reduced in both ears, albeit more in the ear with greater power.

Some embodiments may be used in an acoustic system with at least one microphone located at each side of the head producing microphone output signals, a signal processing path to produce an output signal, and means to present this output signal to the auditory system.

BRIEF DESCRIPTION OF THE DRAWINGS

An embodiment of the present invention will now be described, by way of example only, with reference to the accompanying drawings, in which.

DETAILED DESCRIPTION OF THE PREFERRED EMBODIMENT

The following description of the preferred embodiment is presented for microphone output signals from the left and right sides of the head. The desired sound source to be attended to is presumed to arrive from a specific direction, referred to as the target direction. In the preferred embodiment multiband frequency analysis is employed, using for example a Fourier Transform, with left and right channel signals $X_L(k)$ and $X_R(k)$, respectively, where k denotes the $k^{th}$ frequency channel.

Figure 1:
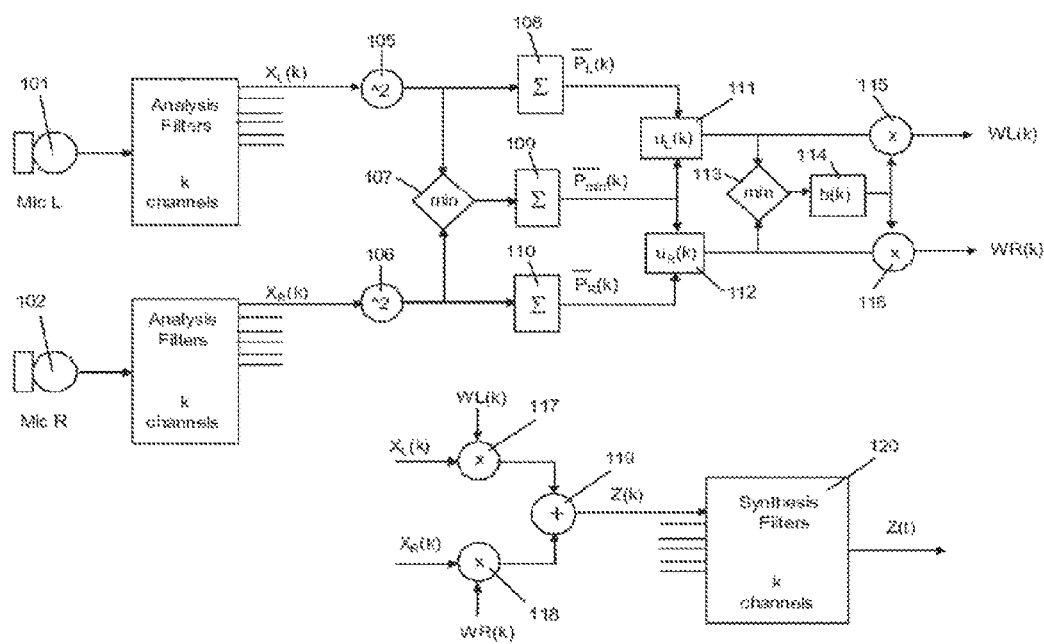
FIG. 1 is a block diagram of a system for reducing unwanted sounds in signals received from an arrangement of microphones.

Referring to FIG. 1, a schematic representation of a system 100 according to the preferred embodiment of the invention is shown. The system 100 is embodied in digital signal processing (DSP) hardware and is represented as functional blocks. An overview of the operation of the blocks of system 100 will now be given, and a more detailed explanation of the calculations taking place will follow.

The outputs from detection means in the form of the left 101 and right 102 microphones are transformed into multichannel signals using an analysis filter bank block, 101 and 102, for example using a Fourier Transform. Subsequently, power for each channel in the left and right signals are independently determined by way of determination means 105 and 106. The left and right channel power outputs are accumulated over time using an integration process, 108 and 110, respectively. The minimum power output is determined, 107. The minimum power value is maintained and accumulated over time in storage means in the form of register 109, using an identical integration process to that applied to the left and right channel power values. A preliminary left channel directional filter weight is calculated, 111, according to the ratio between the left and minimum power. Similarly a preliminary right channel directional filter weight is calculated, 112, according to the ratio between the right and minimum power. The lesser of the left and right channel weights is determined, 113, and scaled, 114, to form an additional diotic weight. The diotic weight is multiplied with the preliminary left and right weights, 115 and 116, to produce the final left and right channel weights, WLL and WRR, respectively. The left channel weight WLL is applied to the left channel signal $X_L$ by attenuation means in the form of programmable filter, 117. Similarly, the right channel weight WRR is applied to the right channel signal $X_R$, by attenuation means in the form of programmable filter 118. The weighted left and right signals are added, 119, to produce the final channel output signal. A broadband time-domain signal is optionally created using a synthesis filter bank, 120, for example using an inverse Fourier Transform, and may benefit from further processing such as adjustment of spectral content or time-domain smoothing depending on the application, as will be evident to those skilled in the art.

The following formulae are applied in the method conducted by system 100 and are identified in FIG. 1.

The power in each channel for signals from microphones located on the left and right sides of the head is calculated as follows:

$$P_L(k)=X_L(k) \cdot X_L(k) \qquad \text{Eq.1}$$

$$P_R(k)=X_R(k) \cdot X_R(k) \qquad \text{Eq.2}$$

Eq.1 and Eq.2 describe the situation for which the target direction corresponds to the direction in which the head is orientated. Optionally the target direction can be altered by filtering the left and right microphone signals. Although the target direction can be specified by the user, it should be obvious to those skilled in the art that an automated process can also be used.

As a further step of the present invention, in the preferred embodiment the minimum power value is determined as follows:

$$P_{min}(k)=\min[P_L(k), P_R(k)] \qquad \text{Eq.3}$$

The time-averaged power is determined in the preferred embodiment by summing the power calculated over N consecutive analysis intervals as follows:

$$\overline{P}_L(k) = \sum^N P_L(k) \qquad \text{Eq. 4}$$

$$\overline{P}_R(k) = \sum^N P_R(k) \qquad \text{Eq. 5}$$

$$\overline{P}_{min}(k) = \sum^N P_{min}(k) \qquad \text{Eq. 6}$$

Alternative time-averaging methods can be used.

The power ratios of the time-averaged minimum power, to the time-averaged left and right microphone power, are computed as follows:

$$ML(k)=\overline{P}_{min}(k)/\overline{P}_L(k) \qquad \text{Eq.7}$$

$$MR(k)=\overline{P}_{min}(k)/\overline{P}_R(k) \qquad \text{Eq.8}$$

A scaling function is applied to the calculated power ratios to define the strength of directional filtering. In the preferred implementation, the scaling function is a compressive non-linearity implemented according to the iterative function:

$$u_L(k)=ML(k) \cdot [2-ML(k)] \qquad \text{Eq.9}$$

$$u_L(k)=u_L(k)^\alpha \times \beta \qquad \text{Eq.10}$$

where $\alpha$ and $\beta$ are scaling factors to control the directional sensitivity as well as the output quality of processed sounds. In the preferred implementation, $\alpha=1.7$, and $\beta=\sqrt{1.7}$. Optionally these scaling factors can be specified by the user or adjusted by an automated algorithm.

Similarly a scalable function is applied to compute the strength of directional filtering for the right ear.

$$u_R(k)=MR(k) \cdot [2-MR(k)] \qquad \text{Eq.11}$$

$$u_R(k)=u_R(k)^\alpha \times \beta \qquad \text{Eq.12}$$

The lesser of the values $u_L(k)$ and $u_R(k)$ is determined according to:

$$b(k)=\min[u_L(k),u_R(k)] \quad \text{Eq.13}$$

The value b(k) is a bilateral weighting factor used to reduce channel weighting for signals from both ears equally. The final channel weights are accordingly:

$$WL(k)=u_L(k)\cdot b(k) \quad \text{Eq.14}$$

$$WR(k)=u_R(k)\cdot b(k) \quad \text{Eq.15}$$

It will be evident to those skilled in the art that there may be benefit from adjusting the scaling values described in Equ. 9-13 in a time varying manner, for example according to the output of a signal to noise ratio estimator.

The channel weighting values WL(k) and WR(k) are applied to the channel signals $X_L(k)$ and $X_R(k)$, respectively, and summed to produce the channel output signal:

$$Z(k)=WL(k)X_L(k)+WR(k)X_R(k) \quad \text{Eq.16}$$

It will be evident to those skilled in the art that there may be benefit from preserving stereo separation of the left and right channel outputs in some applications, rather than adding the left and right signals as described here. Depending on the application, an optional additional step is to recreate a broadband time-domain signal from combining the channel outputs, for example using an inverse Fourier transform.

Figure 2:
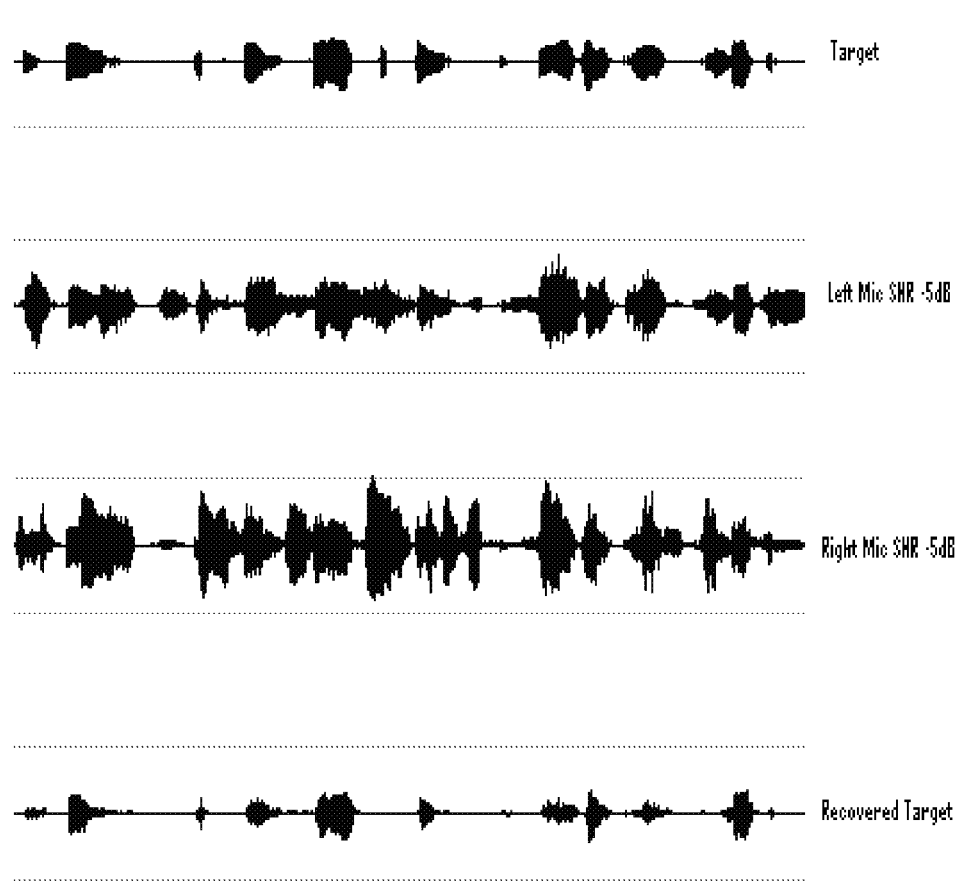
FIG. 2 shows signal plots (in dB) recorded using in an experiment using an implementation of the system of FIG. 1. The top plot is the original target speech presented at zero degrees. The second and third plots are total microphone signals when the target is presented at −5 dB SNR with two interfering talkers (at +−45 degrees). The bottom plot is the recovered target signal after processing.

Referring to FIG. 2, it can be seen that the signal plot "recovered target" closely resembles that of "target". This is despite the significant amount of noise picked up as shown by left and right microphone plots due to the interfering speakers situated at 45 degrees from the target. Therefore, this embodiment of the invention successfully reduces unwanted noise in the signals received from the microphones.

Any reference to prior art contained herein is not to be taken as an admission that the information is common general knowledge, unless otherwise indicated.

Finally, it is to be appreciated that various alterations or additions may be made to the parts previously described without departing from the spirit or ambit of the present invention.

The invention claimed is:

1. A method of reducing unwanted sounds in signals received from an arrangement of microphones, comprising:
   sensing sound sources distributed around a specified target direction by way of an arrangement of microphones to produce left and right microphone output signals;
   determining the powers of the left and right microphone signals;
   determining the minimum of the two microphone power measures; and,
   attenuating the left and right microphone signals based on a comparison of each of the left and right microphone power measures with the minimum power measure.

2. A method according to claim 1, wherein the comparison of each of the left and right microphone power measures with the minimum power measure is based on the ratio of each of the powers of the left and right microphone signals and the minimum power.

3. A method according to claim 2, wherein the ratio between powers is scaled by a function.

4. A method according to claim 3, wherein the scaling function comprises compressor-expander.

5. A method according to claim 3, wherein the scaling function is frequency dependent.

6. A method according to claim 3, wherein the scaling function is controlled by a user.

7. A method according to claim 3, wherein the scaling function is controlled by an automated process.

8. A method according to claim 1, wherein the powers of the left and right microphone signals and the minimum power are time-averaged.

9. A method according to any claim 1, wherein the step of determining the power is frequency specific.

10. A method according to claim 1, further including the step of defining the target direction.

11. A method according to claim 10, wherein the target direction is used to filter the left and right microphone output signals.

12. A method according to claim 11, wherein the step of filtering the microphone output signals involves equalising the left and right signals relative to the target direction.

13. A method according to claim 1, wherein the target direction is controlled by a user.

14. A method according to claim 1, wherein the target direction is controlled by an automated process.

15. A system for reducing unwanted sounds in signals received from an arrangement of microphones, comprising:
   sensing means for sound sources distributed around a specified target direction by way of an arrangement of microphones to produce left and right microphone output signals;
   determination means for determining the powers of the left and right microphone signals;
   determination means for determining the minimum power of the left and right microphone power measures;
   attenuation means for attenuating the left and right microphone signals based on a comparison of each of the left and right microphone power measures and the minimum power.

16. A system according to claim 15, wherein the comparison of each of the left and right microphone power measures with the minimum power measure is based on the ratio of each of the powers of the left and right microphone signals and the minimum power.

17. A system according to claim 16, wherein the means of determining the power includes time averaging.

18. A system according to claim 17, wherein the ratio between powers is scaled by a function.

19. A system according to claim 18, wherein the scaling function comprises compressor-expander.

20. A system according to claim 19, wherein the scaling function is controlled by a user or an automated process.

21. A system according to claim 15, wherein the target direction is used to filter left and right microphone signals.

22. A system according to claim 15, wherein the target direction is controlled by a user or an automated process.

* * * * *